UNITED STATES PATENT OFFICE.

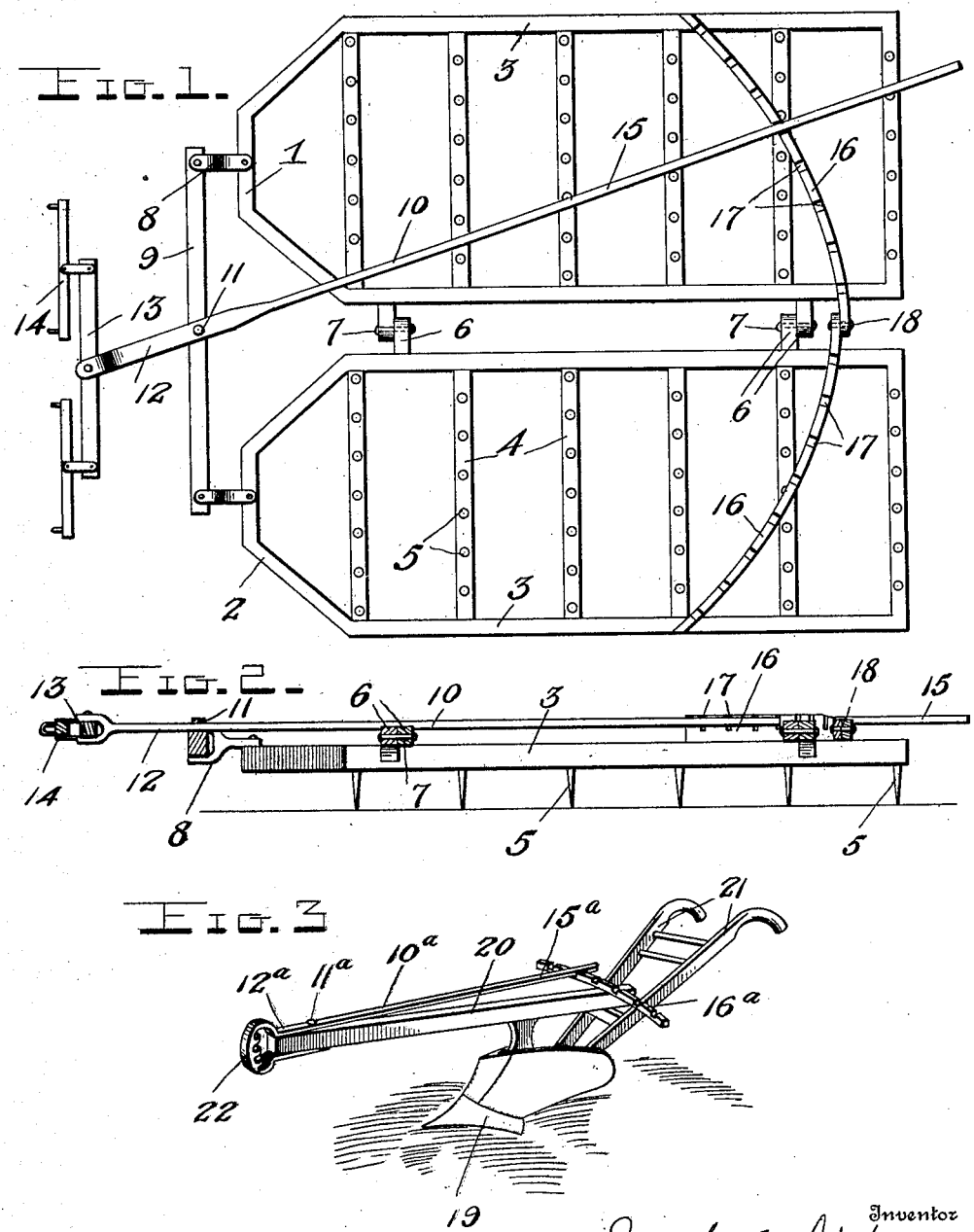

JACOB A. DIETZ, OF SHANESVILLE, OHIO.

DRAFT DEVICE FOR AGRICULTURAL IMPLEMENTS.

No. 919,551.  Specification of Letters Patent.  Patented April 27, 1909.

Application filed December 8, 1908.  Serial No. 466,546.

*To all whom it may concern:*

Be it known that I, JACOB A. DIETZ, a citizen of the United States, residing at Shanesville, in the county of Tuscarawas and State of Ohio, have invented certain new and useful Improvements in Draft Devices for Agricultural Implements, of which the following is a specification, reference being had to the accompanying drawings.
My invention is an improved draft device which may be used on all kinds of agricultural implements and which is particularly adapted for use on a harrow, cultivator, or plow for throwing the draft on either side of the center of the implement, whereby its teeth, shovels or other earth working elements will be prevented from following each other in the same tracks on hilly or uneven ground.
The object of the invention is to provide a device of this character which will be simple and practical in construction, which may be readily applied to all kinds of agricultural implements now in use, and which may be readily operated and adjusted while the harrow, cultivator, plow or the like is in motion, for changing or regulating the draft.

With the above and other objects in view, the invention consists of the novel features of construction and the combination and arrangement of parts hereinafter fully described and claimed, and illustrated in the accompanying drawings, in which—

Figure 1 is a plan view of a double harrow illustrating the application of the invention thereto; Fig. 2 is a vertical longitudinal section through the same; and Fig. 3 is a view showing the application of the invention to a plow.
While my invention may be used upon an agricultural implement of any description, it is illustrated in Figs. 1 and 2 of the drawings as applied to a double harrow of well known form and construction, the same consisting of two sections 1, 2 arranged in parallel relation and hingedly connected. Each of said sections consists of longitudinal side bars 3 united by cross bars 4 carrying harrow teeth 5. The inner side bars 3 of each harrow section is provided with upwardly projecting pivot lugs 6, the lugs on the two sections being arranged to overlap and receive pivot pins 7, which latter are disposed in longitudinal alinement with each other, as seen in Fig.
1. The front ends of the harrow sections are connected by links 8 to a transverse draft bar or member 9.

10 denotes my improved draft lever which is pivoted intermediate its ends on a vertical pivot pin 11 arranged centrally in the member 9. The short forward end 12 of the lever 10 has connected to it in any suitable manner any suitable draft connection or tree to which one or more draft animals may be hitched. As illustrated, however, it has a forked extremity in which is pivoted a double tree 13 carrying two swingle trees 14 for a pair of draft animals. The long rear end 15 of the lever 10 is adapted to be engaged by any suitable locking device whereby the lever will be held in an adjusted angular position but, as illustrated, in said figures, said end 15 of the lever is comparatively long and extends beyond the rear ends of the harrow sections 1, 2 so that the driver or operator of the implement may readily grasp and swing it laterally or horizontally upon its pivot 11 to throw the draft device or tree 8 to either side of the center of the implement and to then engage said end 15 of the lever with a locking rack 16. The latter, as illustrated, consists of two curved or segmental-shaped rack sections in the form of bars secured to the harrow sections and having their upper edges notched to form seats 17 to receive the lever 15 and having their inner ends overlapping and united by a pivot 18 which is disposed in longitudinal alinement with the pivot 7. By making said pivots, 7, 18 to aline longitudinally with each other one harrow section may be swung over upon the other when the draft bar or member 9 is disconnected from the links 8. It will be seen that when the handle end 15 of the lever 10 is grasped and raised slightly it may be sprung out of engagement with the rack 16 and then swung in either direction and quickly locked in adjusted position by merely dropping it into one of the seats or notches 17 in said rack.

In Fig. 3 of the drawings I have shown my invention applied to a plow 19 of well known form having a beam 20 and handles 21. The draft lever 10$^a$ in this embodiment of the invention has its rest or handle end 15$^a$ engaged with a rack bar 16$^a$ secured transversely upon the handles 21; and the forward end 12$^a$ of said lever 10$^a$ is bent upon itself to surround the front end of the beam 20 to which it is united by a vertical pivot pin 11ª. Said bent end of the lever 10ª is shaped to provide a clevis 22 to which a draft device or tree of any description may be applied.

The invention may be applied as well to a reversible or hillside plow as to the ordinary plow illustrated and it is thought that an illustration of the various other possible applications of the invention is unnecessary.

From the foregoing it will be seen that the invention is especially useful on harrows, cultivators, plows and other implements when the latter are used on the sides of hills or on uneven ground since the position of the teeth, shovels or other earth working elements or devices may be prevented from following in each other's tracks by shifting the draft lever to change the line of draft.

While the preferred embodiments of the invention have been shown and described in detail, it will be understood that I do not limit myself to the same, since various changes in the form, proportion, arrangement and details of construction may be resorted to without departing from the spirit or sacrificing any of the advantages of the invention.

Having thus described the invention what is claimed is:

The combination of a double harrow having sections arranged side by side, hinges connecting the adjusted sides of the sections and having their pintles arranged in longitudinal alinement, a transverse draft member at the front ends of the harrow sections, links detachably connecting the ends of the draft member to the front ends of the harrow sections, a longitudinally extending draft lever pivoted intermediate its ends to the center of said draft member, a draft connection upon the short front end of said lever, the long rear end of the latter being resilient and extending rearwardly beyond the rear ends of the harrow sections, and a locking rack consisting of hingedly connected arc-shaped rack bars secured transversely upon the rear portions of the harrow sections and adapted to be engaged by the rear end of said lever, the latter being held in adjusted engagement therewith by reason of its resiliency, the pivot of the hinge connection for the rack bars being in longitudinal alinement with the pivots of the hinges uniting the harrow sections, whereby one harrow section may be folded upon the other when the draft member is disconnected from one of them.

In testimony whereof I hereunto affix my signature in the presence of two witnesses.

JACOB A. DIETZ.

Witnesses:
CORA A. BAKER,
W. H. BAKER.